Patented Jan. 9, 1940

2,186,314

UNITED STATES PATENT OFFICE 2,186,314

CONCENTRATION AND ISOLATION OF WATER-SOLUBLE VITAMINS

Stefan Ansbacher, Sidney, and George E. Flanigan and George C. Supplee, Bainbridge, N. Y., assignors to The Borden Company, New York, N. Y., a corporation of New Jersey No Drawing. Application February 1, 1936, Serial No. 61,890

12 Claims. (Cl. 167—81)

This invention relates to the concentration and isolation of vitamins and refers particularly to the process for the separation and preparation of the water-soluble vitamins of the B-complex, especially the lactoflavin, from substances containing them.

At the present time all the components of the B-complex with the exception of the antineuritic vitamin, recognized as vitamin $B_1$, are not well defined. The term "vitamins of the B-complex" includes the antineuritic factor $B_1$ and other components, some of which are generally designated as vitamin $B_2$ or G. The vitamin $B_2$ or G may consist of one or more factors. According to the definition of the American Society of Biological Chemists (Committee on Vitamin B Nomenclature; Science, 69, 276 (1929), vitamin G is a more heat-stable factor than vitamin $B_1$; it is a water-soluble dietary factor, sometimes called the P—P (pellagra-preventive) factor, and also has to do with maintenance and growth.

The results of experiments indicate that the properties of vitamin G, as illustrated by pellagra-prevention and growth, may not be due to a single entity. The vitamin G as defined above seems to be composed of different entities, and a given manifestation, such as pellagra-prevention or growth, may be due to a complementary effect of the various entities within the vitamin G complex or of the vitamin G (irrespective of its identification) with other dietary factors.

A substance inherent in products of known or recognized vitamin $B_2$ or G manifestations has been isolated as a definite compound which belongs to the class of alloxazines and is generally known as lactoflavin. Whether lactoflavin exhibits vitamin and/or enzymatic activities, is immaterial in so far as this invention is concerned. For convenience, we use the term "vitamin" throughout this specification, in accordance with many authorities, to mean a necessary dietary factor. Lactoflavin of the same structure and properties has been isolated from various sources, such as liver, yeast, egg, whey, hay, etc. The lactoflavin isolated from above sources has been shown to possess biological activities, such as e. g., growth-promoting properties, and is now considered by many authorities to be a component of the vitamin G as defined above.

This invention includes a method of concentrating and isolating the lactoflavin which is considered to be one of the growth-promoting substances involved in the vitamin B-complex.

As is well known, the water-soluble vitamins of the B-complex may be adsorbed on various adsorbents and may be desorbed from the adsorbate. Among the most commonly employed adsorbents is fuller's earth, although other diatomaceous earths, such as kaolin, and other adsorbents, such as silica gel, etc., and also various carbons have been used. Many eluting agents of widely different character have been employed for the desorption of the active matter from the adsorbate. For this purpose, inorganic acids, alkalies or salts in aqueous or alcoholic solution have been used. An eluate prepared with such substances contains a large amount of inert material and only a small fraction of the vitamin material which had been previously adsorbed. Certain organic bases, especially amines, namely cyclic tertiary amines, such as pyridine, have also been employed for the elution; the yield of active material, when using the latter substances, is variable, depending upon the eluting mixture and also upon the character and amounts of extraneous material previously adsorbed. Since the active material, as contained in natural products is found only in extremely small amounts and is accompanied by very large quantities of inactive matter, such as e. g. substances of high molecular weight, it is desirable that in any method of desorption the merits of selective elution are recognized in order that the largest amount of active material with the least amount of inert material be removed from the adsorbate. Methods which can be devised to accomplish this result are obviously an improvement over those methods in which the active material together with much of the naturally present extraneous matter previously adsorbed is eluted, and in which the possibility of applying the method of selective elution is not considered. The application of a method which makes use of a selective elution would considerably simplify the process of concentration and subsequent purification permitting increased yield of the active material from given sources.

It is an object of the present invention to provide an improved method for the separation of water-soluble vitamins from substances containing them, in which selective elution is utilized. It is also an object to provide an improved procedure for the concentration and isolation of lactoflavin. Another object is to utilize an improved eluting agent in such separations. It is also an object to provide improved procedures for the separation and purification of water-soluble vitamins. Other objects will become apparent.

We have found that ketones and aldehydes in an aqueous or weakly alcoholic medium are selective elutants which permit the recovery of an increased amount of active material with less of the inert material than the eluting agents heretofore employed. Specific examples of ketones useful for this purpose are dimethyl ketone (acetone), or methyl-ethyl ketone, or benzophenone, and of aldehydes are aldehyde ethylic (acetaldehyde), or benzaldehyde, but other aliphatic or aromatic compounds containing the ketone or the aldehyde group, in aqueous or weakly alcoholic solutions or mixtures, are effective in overcoming the affinity of the adsorbent for the vitamins and are useful in removing the active vitamin material from the adsorbate with relatively little of the inert material.

The following is a specific description of our process of concentration and purification of the water-soluble vitamins (lactoflavin) as applied to the crude milk vitamin concentrate, obtained by the procedure described in U. S. Patent No. 2,006,699 (July 2, 1935) and herein referred to as XXX liquor, but it is obvious that the procedures may also be applied to the concentration and separation of vitamins from other sources:

About 100 lb. of XXX liquor, containing about 70 lb. of total solids, are diluted with about 175 lb. of water and about 35 lb. of muriatic acid (sp. gr. 1.18). The acidified material is contacted with about 10 lb. of a clay, such as e. g. fuller's earth, under agitation at room temperature for about two hours (it might be practical to contact with less clay, namely e. g. about 5 lb.; a lower amount of clay might not adsorb all the lactoflavin present in the acidified liquor, however, it would certainly adsorb a high percentage of the total lactoflavin present and would adsorb considerably less inert material which may interfere with the subsequent concentration and purification of the lactoflavin). The adsorbate is removed by centrifuging or by any other suitable mechanical means, such as e. g. decantation or filtration, and washed with water until the wash water does not give the silver nitrate reaction, indicative of ionized chlorine, any longer. (In applying the method to the particular material under consideration, washing of the adsorbate until chloride-free may serve as a convenient criterion for showing when material not truly adsorbed has been completely, or substantially completely, removed. In the working of the process where ionized chlorine is not present in the basic material, it is obvious that this criterion is not applicable. In such a case the disappearance of color in the wash water may be a convenient criterion.) Such adsorbates may be used for elution with or without previous drying.

The washed adsorbate is then eluted by suspending it in a mixture of acetone and water and agitating for about 1½ hr. An eluting mixture containing as low as 2 volumes of acetone for each volume of water and as high as 5 volumes of acetone for each volume of water might be used (a mixture containing 4 volumes of acetone and 1 volume of water appears to be the preferred one). For every gram of adsorbate about 5 to 10 ml. of eluting mixture may be used. A 10 lb. adsorbate (fuller's earth) may be therefore suspended in about 90 lb. of an eluting mixture which contains about 72 lb. of acetone and about 18 lb. of water. The eluate thus obtained is removed by any suitable mechanical means, such as e. g. decantation, the eluted fuller's earth washed with about 30 lb. of a 4:1 acetone:water mixture, and the two acetone solutions are combined and freed from acetone by distillation. Thus a concentrate is obtained which may be further processed by any of the following methods:

Method I

The concentrate may be evaporated in vacuo to dryness, the dry residue leached with hot or boiling water (about 3 to 5 10-ml. portions of water are sufficient to leach out a large proportion of the lactoflavin), the leachings filtered and the filtrates combined and evaporated in vacuo to dryness. The dry residue may be first leached three times with about 10 ml. portions of ether and then with hot or boiling water, or the residue may be directly leached with 10 ml. of hot or boiling water followed by leachings with warm alcohol. The water and alcohol leachings are combined, filtered and the filtrates allowed to stand at room temperature or at lower temperatures, such as a temperature between 1 and 3° C. If the lactoflavin is of sufficient concentration to permit crystallization, the lactoflavin crystals may be removed and identified by physical, chemical as well as biological methods and may be used as desired. If lactoflavin does not crystallize from the particular concentration (relative concentration of lactoflavin will depend upon the quantity present in the original material), there remains nevertheless a concentrated lactoflavin extract of relatively high purity. If desired, the crystals may be obtained by further concentration of the lactoflavin.

Method II

The concentrate is freed in vacuo as completely as possible from acetone, diluted with water to about 150 ml. and contacted with a sufficient amount of Frankonit "KL" (a clay or fuller's earth) to completely, or substantially completely adsorb the active material. In the case of preparation of lactoflavin, the quantity of adsorbent necessary can be determined by ultraviolet examination of the solution after treatment with the adsorbent; adsorption is complete when the solution after treatment with the adsorbent is free, or substantially so, from a greenish fluorescent in black light (light transmitted by an ultra-violet light generator through a heat resisting red-purple ultrafilter which transmits primarily radiations between about 3100 and 4100 A. and very slightly in the red, its peak transmission being at about 3650 A.). In the above example, about 15 gm. of Frankonit "KL" may be added, the mixture agitated for about an hour, the adsorbate removed by any suitable mechanical means and washed with water until the wash water appears to be colorless. The washed adsorbate is then eluted in about 150 ml. of a 4:1 acetone:water mixture, the adsorbent removed and washed with about 50 ml. of a 4:1 acetone:water mixture, the two acetone solutions combined and freed from acetone by distillation. The thus obtained concentrate is processed either by following Method I or by following Procedure 1 or Procedure 2.

Procedure 1

About 5 gm. of silver nitrate dissolved in little water are added to any of the above concentrates and preferably to the concentrate from Method II, or preferably the concentrate is added to the silver nitrate solution; the mixture thus obtained is made weakly but definitely alkaline by adding ammonia, the precipitate is removed by any suitable mechanical means, such as e. g. centrifuging, washed with weakly ammoniacal water and the washed residue is leached with about three 25 ml. portions of warm (about 50° C.) 50% acetic acid solution. These leachings are combined, filtered, the clear filtrates diluted to about 250 ml. and then exposed to hydrogen sulfide gas for about three hours. The thus treated product may be allowed to stand over night at room temperature in order to insure the complete, or substantially complete, precipitation of the insoluble sulfides. The next morning these are removed by any suitable mechanical means, such as e. g. filtration, the filtrate concentrated in vacuo to about 10 ml., neutralized by adding sodium hydroxide, while keeping the concentrate at a low temperature (about 1 to 5° C.). The neutral solution is diluted to about 150 ml. and contacted with about 15 gm. of Frankonit "KL" for about an hour, preferably under agitation, the adsorbate removed by mechanical means and washed until the wash water appears to be colorless, the washed adsorbate suspended in about 150 ml. of a 4:1 acetone:water mixture and agitated for about an hour and a half. The adsorbent is then removed and washed with about 50 ml. of a 4:1 acetone:water mixture; the two acetone solutions are combined and freed from acetone by distillation. The thus obtained concentrate is then further processed by following Method I.

*Procedure 2*

About 2 gm. of picric acid are added to any of the concentrates and preferably to that from Method II, and the mixture heated until the picric acid is practically dissolved. The product may be cooled, the precipitate removed by mechanical means, such as filtering, and washed with a saturated solution of picric acid. The filtrate is concentrated in vacuo to a small volume, the concentrate cooled and the picric acid which had crystallized is removed. The last traces of picric acid are removed by ether extraction of the filtrate and the filtrate is further processed by following Procedure 1.

*Method III*

The concentrate from the original elution is added to about 5 gm. of silver nitrate dissolved in little water. The mixture thus obtained is then treated as outlined under Method II, Procedure 1, namely, removal of the silver precipitate, its resolution followed by the hydrogen sulfide treatment, re-adsorption on Frankonit "KL" and elution with an acetone mixture. The eluate thus obtained is then freed from acetone and processed as outlined under Method I.

*Method IV*

About 2 gm. of picric acid are added to the concentrate from the original elution. The mixture thus obtained is then treated as outlined under Method II, Procedure 2.

The above examples of the working of our process have been cited as illustrative of the various applications of our discovery for the preparation of vitamin concentrates and as steps in the purification of lactoflavin; however, we do not limit ourselves to the particular basic material cited, nor to the quantities, times, temperatures, steps of procedure or order of these steps, which were cited simply as a means of clearly describing the working of our invention. The mixtures described above as eluting agents may be used in acidified or alcoholic media. Also, other ketones or aldehydes may be employed. The eluting with ketones or aldehydes may also be used in conjunction with other eluting procedures and may either follow or be followed by such procedures.

Our process and the principle of our invention may also be applied to a variety of other substances, such as e. g. milk products (especially whey), meat products (especially liver), cereal products, yeast, vegetables, etc., which contain water-soluble vitamins (lactoflavin).

Among the water-soluble vitamins of the B-complex, lactoflavin is one which is sensitive to light. Therefore, it is advisable for the sake of preventing decomposition to work our process under the exclusion of destructive light. Likewise it seems desirable to concentrate in the various steps of the process at not too high a temperature (as e. g. below 50° C.) in order to avoid further possibilities of harming the active material in solution. Furthermore, it appears that lactoflavin might be altered by strong alkalies. Therefore it is desirable to limit the use of alkalies in the entire process to the strict minimum. If the addition of alkalies cannot be avoided, such as e. g. in the preparation of the silver salt of lactoflavin, they should preferably be added while keeping the mixture cold (about 1 to 5° C.).

Other examples of media which may be used for eluting the lactoflavin from a clay, such as e. g. fuller's earth or Frankonit "KL", or other adsorbates are as follows:

(a) A mixture containing about 2 to 5 parts of methyl-ethyl ketone and 1 part of water.

(b) A mixture containing about 2 to 5 parts of acetone, 1 part of alcohol and 1 part of water.

(c) A mixture containing about 2 to 5 parts of methyl-ethyl ketone, 1 part of alcohol and 1 part of water.

(d) A mixture containing about 1 part of benzophenone, 32 parts of alcohol and 16 parts of water.

(e) Formalin, which contains about 37% of formaldehyde and 63% of water-methanol mixture.

(f) A mixture containing about 1 to 4 parts of acetaldehyde and 1 part of water.

(g) Benzaldehyde mixed with about an equal volume of water.

In describing the invention we have included concise outlines of procedure which are practical and have been found to yield a satisfactory product, but they are not to be considered as preferred processes in all instances. The practical sequence of steps which might be selected as preferable will be dependent upon practical circumstances, the basic material used, and the degree of desired purity of the concentrates or crystalline products.

If it is desired to produce a concentrate of a relatively high concentration of lactoflavin, the basic material is treated with a clay, such as e. g. fuller's earth or Frankonit "KL", etc., as outlined in the first paragraph of the illustrative examples. The adsorbate thus obtained is washed and eluted with an aldehyde or ketone in an aqueous or alcoholic medium as set forth in any of the methods described for the illustrative example. The eluate thus obtained is concentrated in vacuo to dryness. Such a residue will be found to contain a high amount of active material in a relatively pure form.

If it is desired to proceed to the crystallization stage, further steps may be used such as outlined under Methods I-IV, inclusive.

It is apparent that many other modifications and applications of the invention may be used and made. The terms employed in describing the invention have been used as terms of description and not as terms of limitation and it is intended that all equivalents thereof be included within the scope of the appended claims.

We claim:

1. In the separating of lactoflavin the steps of eluting an inorganic adsorbate containing it with an aqueous solution of acetone.

2. A method for separating lactoflavin from inorganic adsorbents of mineral origin, comprising eluting the adsorbate with about 4 parts of acetone in the presence of about 1 part of water by volume.

3. A method of separating lactoflavin from inorganic adsorbents comprising eluting the adsorbate with a liquid agent containing a compound selected from the group consisting of ketones and aldehydes that are predominantly reactive as ketones or aldehydes, in an aqueous medium.

4. A method of separating lactoflavin from inorganic adsorbents comprising eluting the adsorbate with a liquid agent containing a compound selected from the group consisting of ketones and aldehydes that are predominantly reactive as ketones or aldehydes, in an aqueous alcohol solution.

5. A method of separating lactoflavin from inorganic adsorbents comprising eluting the adsorbate with a liquid agent containing a ketone that is predominantly reactive as a ketone, in an aqueous medium.

6. A method of separating lactoflavin from inorganic adsorbents comprising eluting the adsorbate with a liquid agent containing an aldehyde that is predominantly reactive as an aldehyde, in an aqueous medium.

7. A method of separating lactoflavin from inorganic adsorbents comprising eluting the adsorbate with an aqueous solution of acetone, and crystallizing the lactoflavin from the eluate.

8. A method of concentrating lactoflavin comprising eluting an inorganic adsorbate containing it with an aqueous solution of acetone, and evaporating the eluate.

9. A method of concentrating lactoflavin comprising eluting an inorganic adsorbate containing it with an aqueous solution of acetone, evaporating the eluate to dryness, dissolving the lactoflavin from the dried eluate, and crystallizing the lactoflavin from the solution thus obtained.

10. In the separating of lactoflavin from an inorganic adsorbent, the step of eluting the adsorbate containing lactoflavin with an aqueous acetone solution containing 2 to 5 parts acetone for each part of water by volume.

11. A method of separating lactoflavin from inorganic adsorbents comprising eluting the adsorbate with about 5 to 10 c.c. per gram of adsorbate of an aqueous acetone solution containing about 2 to 5 parts acetone for each part of water by volume.

12. A method of separating lactoflavin comprising adsorbing said lactoflavin on an adsorbent material, and thereafter desorbing said lactoflavin by treating the adsorbate with an aqueous solution of acetone.

STEFAN ANSBACHER.
GEORGE E. FLANIGAN.
GEORGE C. SUPPLEE.